United States Patent
Barrett, Jr.

[15] 3,661,646

[45] May 9, 1972

[54] BATTERY PLATE BRIDGE SUPPORT

[72] Inventor: James H. Barrett, Jr., 3863 Surrey Road, Toledo, Ohio 43615

[22] Filed: Aug. 10, 1970

[21] Appl. No.: 62,527

[52] U.S. Cl. ............................................................136/79
[51] Int. Cl. .........................................................H01m 1/04
[58] Field of Search ....................................136/79–81, 166

[56] References Cited

UNITED STATES PATENTS

| | | | |
|---|---|---|---|
| 2,767,237 | 10/1956 | Gritman | 136/79 |
| 1,283,779 | 11/1918 | Hutchison et al. | 136/79 |
| 1,577,912 | 3/1926 | Lange | 136/166 |

FOREIGN PATENTS OR APPLICATIONS

| | | | |
|---|---|---|---|
| 236,316 | 7/1925 | Great Britain | 136/79 |
| 250,333 | 4/1926 | Great Britain | 136/79 |

*Primary Examiner*—Anthony Skapars
*Attorney*—Hugh Adam Kirk

[57] ABSTRACT

A plurality of parallel bridge supporting rails for the lead plates of a storage battery for location in the bottom of the battery box, which rails are connected together by parallel cross bridging members of lesser height than the rails, whereby mud from the battery plates is free to settle and move under both the rails and the cross bridging members. The rails and cross bridging members are molded as a unit from a reinforced, plastic material which has smooth and rounded upper surface to which mud does not adhere.

9 Claims, 6 Drawing Figures

Patented May 9, 1972

INVENTOR.
JAMES H. BARRETT, JR.

BY
Hugh A Kirk
ATTORNEY

Patented May 9, 1972

INVENTOR.
JAMES H. BARRETT, JR.

BY
*Hugh A. Kirk*
ATTORNEY

BATTERY PLATE BRIDGE SUPPORT

BACKGROUND OF THE INVENTION

Previously such battery plate bridge supports were either formed integrally in the bottom of the battery boxes or tanks or made of hard rubber. Because of the comparatively low inherent strength of such prior supports, they had to be made rather thick to support the heavy weight of the lead plates, and therefor they covered a substantial area of the bottom of the battery box thereby limiting the amount of mud which could accumulate therein before it reached the bottom of the plates and shorted them out. This mud is composed of lead compounds which fall from the surface of the plates during charging and recharging of the batteries. Furthermore such prior art supports often divided the bottom of the battery box into separate compartments in some of which more mud accumulated than others, which also shortened the life of the battery when that compartment filled with mud to short out the plates above it. Also these previous hard rubber bridge supports when not formed as part of the battery box itself, were difficult to cut or saw without leaving burrs which would collect mud. Such cutting is often necessary since industrial storage batteries are of many different sizes, and these supports are usually made in standard lengths to fit only the largest sizes.

SUMMARY OF THE INVENTION

The battery plate bridge support according to the present invention comprises at least four parallel rails and a plurality of parallel cross bridging members forming a type of a grille which, if required, may be cut to fit different size battery boxes. The rails, upon which the bottom of the bottom edges of the plates of the storage battery rest, may be four in number and spaced according to feet or lugs on alternate positive and negative plates in the batteries. These rails are supported by legs forming arches between them which arches are transversely aligned in adjacent rails, with the legs of these arches connected together by the cross bridging members. These cross bridging members are of lesser height than the rails and also have archways between the legs of the parallel rails, which archways are aligned parallel to the rails. Furthermore these cross bridging members may be hollow such as inverted V-shaped members to reduce further their area of contact with the bottom of the battery box, thus permitting mud to accumulate under them. If desired, these support members may be formed with rails of different heights, the higher rails of course permitting more mud to accumulate beneath them before the battery plates are shorted out by it.

The grille of these rails and cross bridging members may be formed of a reinforced plastic material having a high strength and a low surface coefficient of friction, so as not to adhere readily to other objects or materials, such as a polyethylene containing between about 20 percent and 30 percent of glass fibers.

When the plate supports of this invention are employed in industrial batteries used in vehicles, such as lift trucks which are subject to many changes in movement and vibrations, the mud that settles to the bottom of such batteries is thereby permitted to flow not only under and through the arches and archways between the rails and cross bridging members, but also under the cross bridging members and seek a common level, thus allowing a much larger accumulation of mud at a lower level than in prior art batteries with such plate supports, which in turn extends the life of the batteries. Furthermore since the plastic material of which the present plate supports are made has a comparatively high intrinsic strength, it may be made thinner and of less bulk, which permits a further reduction in the area that needs to be in contact with the bottom of the battery for supporting the heavy lead plates.

BRIEF DESCRIPTION OF THE VIEWS

The above mentioned and other features, objects and advantages, and a manner of attaining them are described more specifically below by reference to embodiments of this invention shown in the accompanying drawings, wherein.

DETAILED DESCRIPTION OF PREFERRED EMBODIMENTS

Figure 1:
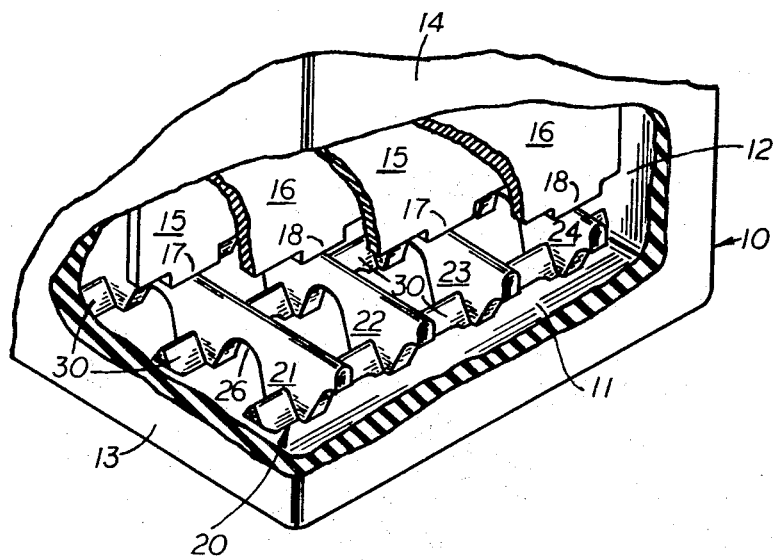
FIG. 1 is a perspective view of the bottom corner of a storage battery having parallel lead plates, with parts broken away, showing a portion of a preferred embodiment of the bridge support of this invention.

In FIG. 1 there is shown a lower corner of an industrial storage battery 10 comprising a box or casing having a flat horizontal bottom 11 with vertical sides 12, 13 and 14 around the edges thereof. Resting between the sides 12 and 13 and with its end against the side 14 there is shown a portion of the battery plate bridging support member 20 according to this invention. This support 20 comprises four parallel rails 21, 22, 23 and 24, having rounded upper surfaces which lie in the same plane parallel to and spaced from the bottom 11. Alternate ones of these rails 21 through 24 support alternate positive and negative lead battery plates 15, 16, respectively through the lower projecting feet portions 17 and 18, respectively, on the bottom edges of said plates.

Figure 2:
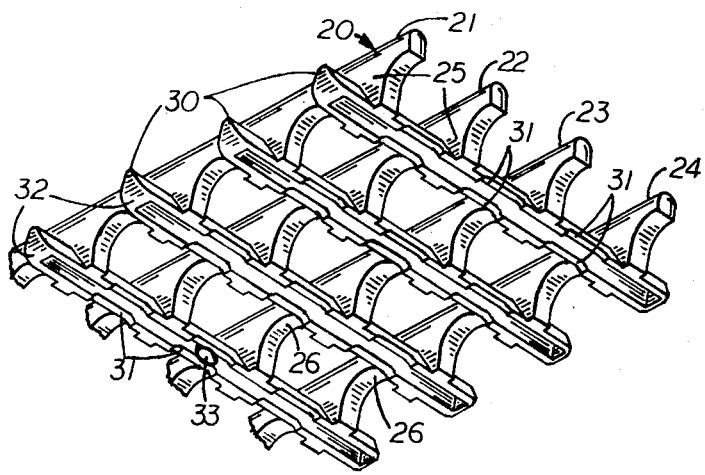
FIG. 2 is a perspective view of one end of a plate support as shown in FIG. 1, looking at the underside thereof showing the hollow cross bridging members between the arches which support the rails.
Figure 3:
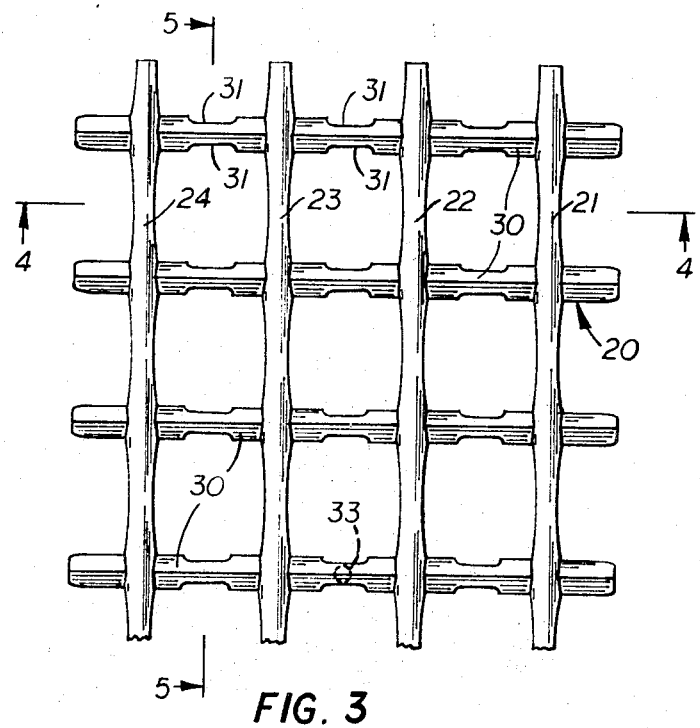
FIG. 3 is an enlarged plan view of one end of the plate bridge support shown in FIGS. 1 and 2.
Figure 4:
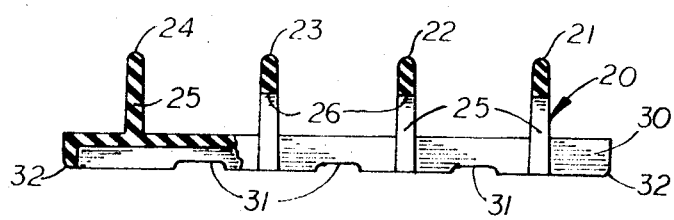
FIG. 4 is a section taken along line 4 — 4 of FIG. 3 with one end thereof in section showing the hollow underside of a cross bridging member which connects the rails together.
Figure 5:
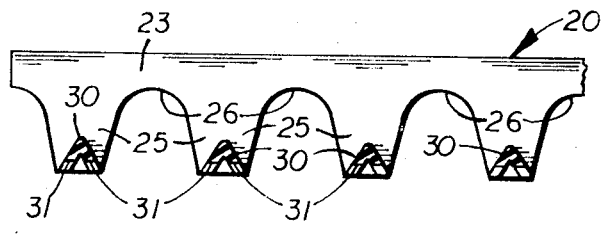
FIG. 5 is a section taken along line 5 — 5 of FIG. 3 showing the arches between the cross bridging members, and the inverted "V" cross-section of these members through the legs of the arches.

These rails 21 through 24 are supported by legs or feet portions 25 (see FIG. 5) in between which are formed passageways or arches 26. All of these rail arches 26 are transversely aligned in each of the rails 21, 22, 23, and 24, as are their feet portions 25. The spacing and size of these feet portions of these rails are such that their arches 26 bridge more space or area on the bottom 11 of the battery 10 than are covered by their feet portions 25. Integrally connecting the feet of adjacent rails 21 through 24 and transversely of the rails, are a plurality of parallel cross bridging members 30 of lesser height from the bottom 11 than the top surfaces of rails 21 through 24. These cross members or strips 30 may have an inverted hollow V-shaped cross-section as shown in FIGS. 2, 4 and 5, with slightly rounded "V" top outer edges. They also have passageway or archway portions 31 between and parallel to the feet 25 and the rails 21 through 24, which bridging or strip arches or archways 31 are in both sides of the inverted "V" cross-section of these cross bridging members 30. Thus these cross bridging members 30 have common legs or feet for their archways with the feet 25 of the rails, so that as little area as possible is in contact with the bottom 11. Opposite ends of these cross members 30 may have their lower edges rounded or bevelled as at 32 (see FIGS. 2 and 4), which enable them to fit more snugly into the corner of the battery box between the bottom 11 and sides 12 and 13. In FIG. 3 and 2 there is shown a spew 33 through which the whole support 20 has been injection molded, and other of these spews and/or expansion ducts may be provided along the length of the support 20 as required.

Figure 6:
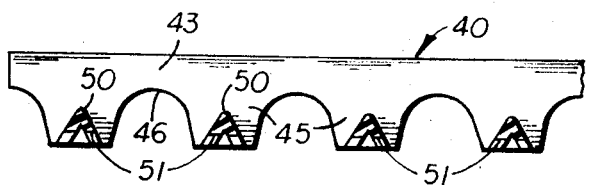
FIG. 6 is a view similar to FIG. 5 of another embodiment of this invention having rails of lesser height than those shown in FIG. 5.

If desired, the rails 21 through 24 may be of lesser height as shown in FIG. 6 for the rail 43, which is a view of a support similar to that shown in FIG. 5 with legs 45, rail arches 46 and the strips or cross bridging members 50, with strips archways 51, corresponding respectively with rail 23, legs 25, rail arches 26, cross members 30, and archways 31, all as described above and having the same functions.

The battery plate bridge support member is preferably made of a moldable reinforced plastic material, such as a glass fiber reinforced polyethylene or polypropylene plastic, such as for example, Dupont's "Althon" G 0530, in which the glass fibers are coated so as to form a molecular bond with the plastic. The amount of glass fibers in this plastic material may vary between about 10 percent and 40 percent by weight and preferably between about 15 percent and 30 percent by weight, and more preferably about 20 percent.

Specifically, two embodiments of the support have four rails, one with rails 1 ¼ inches high as shown in FIGS. 1 through 5, and the other with rails seven-eighths inch high as shown in FIG. 6. Both of these supports 20 and 40 are molded as grilles 18 inches long and 6 inches wide with their four rails equally spaced 1 ⅝ inches apart in the center of their cross members 30 and 50. These rails taper slightly outwardly in a downward direction averaging in thickness about 1 ¼ inches. The arches 26 in the embodiments of FIGS. 1 through 5 are seven-eighths inch wide and their feet 25 are five-eighths inch wide at their bottoms, with the inverted V-shaped cross members 30 having an angle of about 50° and being about one-half inch high and having sides about one-eighth inch thick and its arches 31 about one-eighth inch high. For the embodiment shown in FIG. 6 which has rails seven-eighths inch high, the cross members 50 are only three-eighths inch high and the feet 45 are correspondingly wider with its arches 46 only one-half inch high and its arches 51 about one-eighth inch high.

It should be clearly understood that the bridge support 20 or 40 of this invention may be made of other plastic materials and of different lengths and sizes without departing from the scope of this invention, and the exact design configuration of the arches and structures are primarily for easy molding and not solely directed to the advantages and function of the support.

While there is described above the principles of this invention in connection with specific apparatus, it is to be clearly understood that this description is made only by way of an example and not as a limitation to the scope of this invention.

I claim:

1. A battery plate bridge support of a reinforced molded plastic material having a non-adhering outer surface, comprising:
   A. a plurality of equally spaced parallel rails upon which battery plates rest and which are supported by a plurality of rail arches having feet portions, and
   B. a plurality of parallel cross bridging members connecting said feet portions of said rail arches , said bridging members having bridging arches between adjacent rails, which bridging arches have their feet portions adjacent the feet portions of said rail arches, whereby mud from the plates may settle and flow under and between said rails and bridging members.

2. A battery support according to claim 1 wherein said reinforced molded plastic material comprises a polyethylene plastic filled with between about 10 percent and 40 percent by weight of glass fibers.

3. A battery support according to claim 2 wherein said plastic material comprises between about 15 percent and 30 percent by weight of glass fibers.

4. A battery support according to claim 2 wherein said plastic material comprises about 20 percent by weight of glass fibers.

5. A battery support according to claim 1 having at least four parallel rails.

6. A battery support according to claim 1 having at least four cross bridging members.

7. A battery support according to claim 1 having twelve cross bridging members.

8. A battery support according to claim 1 wherein said cross bridging members have a hollow inverted "V" shaped cross section.

9. A battery plate bridge support grid of reinforced molded plastic material comprising:
   A. four equally spaced parallel rails having rounded tops and supported by equally longitudinally spaced transversely aligned legs forming rail archways between said legs more than half the height of said rails, and
   B. inverted hollow "V" shaped cross-sectional strips connecting the bottoms of said transversely aligned legs and being less than half the height of said rails, said strips having rounded tops, rounded lower ends, and common feet with said legs forming strip archways parallel to said rails and transversely aligned with each said strip, whereby mud settling from the plates in the battery can collect under both crossing groups of archways and under said strips.

* * * * *